United States Patent [19]

Thorn et al.

[11] Patent Number: 4,512,455
[45] Date of Patent: Apr. 23, 1985

[54] DISC TURNOVER DEVICE

[75] Inventors: Joseph H. Thorn; John J. Prusak, both of Marion, Ind.

[73] Assignee: RCA Corporation, Princeton, N.J.

[21] Appl. No.: 538,547

[22] Filed: Oct. 3, 1983

[51] Int. Cl.³ .............................................. B65G 47/24
[52] U.S. Cl. ................................................... 198/404
[58] Field of Search .................. 198/404, 403, 624; 271/69, 186; 414/763, 783, 226, 736, 739

[56] References Cited

U.S. PATENT DOCUMENTS

| 1,210,096 | 12/1916 | Parker | 198/404 |
| 3,314,554 | 4/1967 | Cuniberti | 198/403 |
| 3,503,484 | 3/1970 | Mosetich et al. | 198/404 |
| 3,610,397 | 10/1971 | Bok | 198/404 |
| 3,617,054 | 11/1971 | Schilling | 271/69 |
| 3,973,671 | 8/1976 | Schwenke | 198/404 |

FOREIGN PATENT DOCUMENTS

| 588170 | 1/1978 | U.S.S.R. | 198/403 |
| 633779 | 11/1978 | U.S.S.R. | 414/763 |

Primary Examiner—Joseph E. Valenza
Assistant Examiner—Daniel R. Alexander
Attorney, Agent, or Firm—Birgit E. Morris; Donald S. Cohen

[57] ABSTRACT

A disc turnover device is mounted along a conveyor which supports discs in a flat horizontal position and carries the discs along a horizontal path. The turnover device includes a pair of wheels mounted on opposite sides of the conveyor for rotation about a common axis perpendicular to the path of the conveyor. Each wheel has a plurality of circumferentially spaced pickup arms pivotally mounted at one end on the wheel for pivotation toward and away from the conveyor. Each arm on one wheel is in parallel opposed relation with an arm on the other wheel to provide a plurality of opposed arms. A spring urges each arm toward the conveyor and caming projections move the arm away from the conveyor at selected positions along its path of rotation. A pickup head is mounted on each arm and is slidable longitudinally along the arm. Each head has fingers for engaging and holding the edge of a disc.

12 Claims, 4 Drawing Figures

DISC TURNOVER DEVICE

BACKGROUND OF THE INVENTION

The present invention relates to a disc turnover device, and, more particularly, to a device for lifting a flat disc from a continuously moving conveyor, turning the disc over and placing it back on the conveyor.

There has been recently developed a high density recorded disc, i.e. a video disc, in which the recorded information is in the form of a surface relief pattern formed along a spiral path on both major surfaces of the disc. The recorded disc is played back with a stylus that senses the information capacitively. In order to reduce friction and to prevent wear of the stylus and/or the disc during playback, a very thin layer, perferably between 200 and 400 Angstroms thick, of a lubricant is provided on the surface of the disc.

One apparatus for coating a disc with a thin layer of a lubricant is shown and described in U.S. Pat. No. 4,424,761 of J. H. Thorn et al., filed Sept. 30, 1982, entitled "Nozzle for Coating a Disc with a Lubricant." In this apparatus, the disc is carried in a flat horizontal position on a horizontally/moving conveyor through a coating chamber where the lubricant is directed downwardly onto the surface of the disc. However, to coat both sides of the disc, it is necessary to turn the disc over and pass it through another coating chamber where lubricant is applied to the second side of the disc. For such a coating system it is desirable to have a device which lifts the disc from the continuously moving conveyor, turns the disc over and then places the disc back on the conveyor.

SUMMARY OF THE INVENTION

An apparatus for turning a disc over includes a conveyor for supporting a disc in a flat horizontal position and carrying said disc along a horizontal path. A pair of spaced parallel arms are mounted on opposite sides of the conveyor for rotation about a point adjacent one end thereof in planes parallel to the path of the movement of the conveyor. A pickup head is on the other end of each arm and is slidable along the arm. The arms are provided with means for moving their other ends toward each other to pick up a disc and away from each other to release the disc.

DETAILED DESCRIPTION OF THE PREFERRED EMBODIMENT

Figure 1:
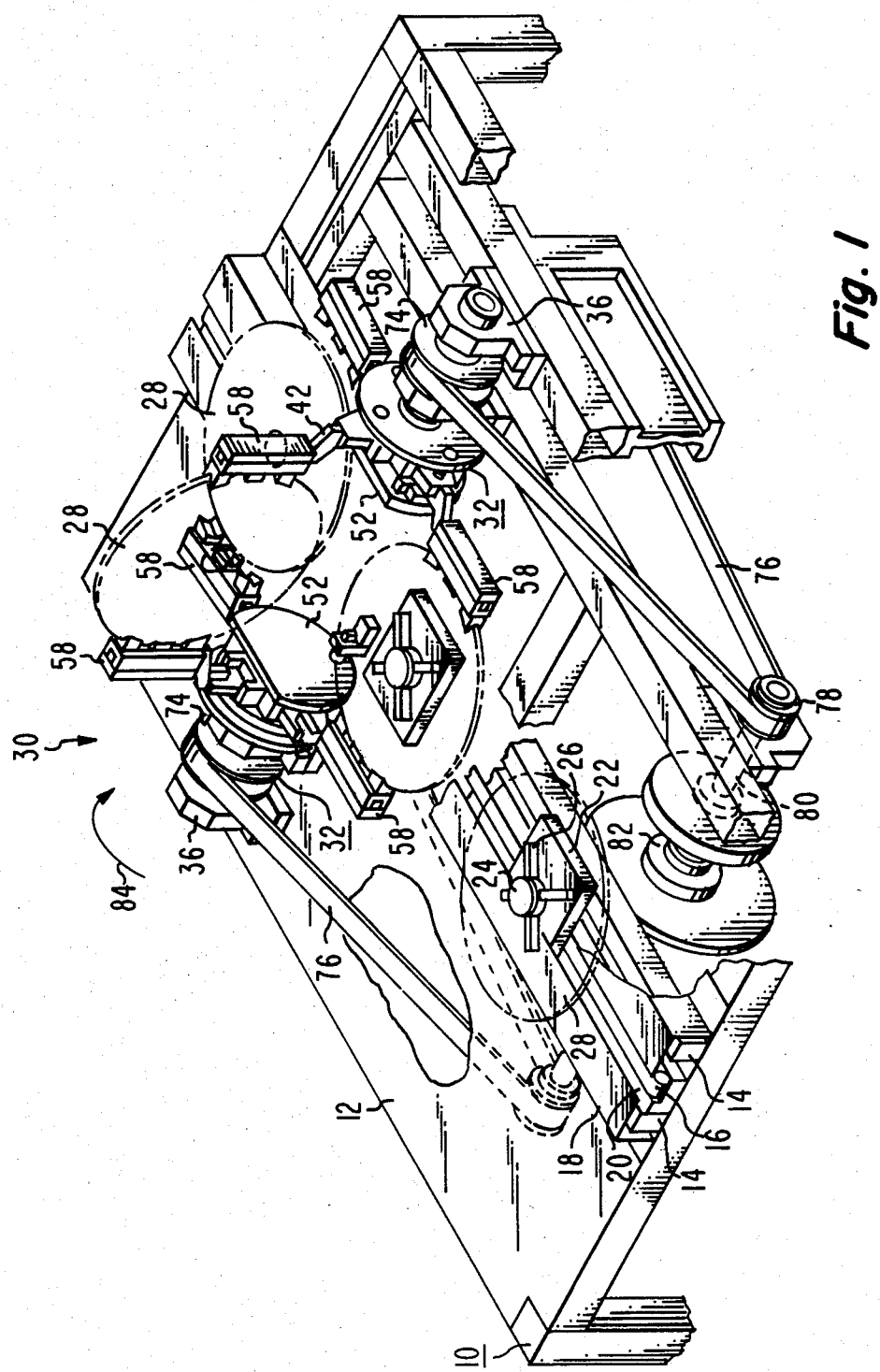
FIG. 1 is a perspective view of the turnover device of the present invention.

Referring initially to FIG. 1, a conveyor apparatus, which incorporates the turnover device of the present invention, includes a supporting base 10 having a top plate 12. Along the top plate 12 are rails 14 which support and guide a continuously moving conveyor 16. The conveyor 16 extends along a horizontal path over the top plate 12. A cover 18 extends over the conveyor 16 and has a longitudinally extending opening 20 therein. Support members 22 are mounted in spaced relation along the conveyor 16. Each support member 22 has a cylindrical hub 24 projecting upwardly therefrom through the opening 20 in the cover 18. A plurality of circumferentially spaced fingers 26 extend radially outwardly from the hub 24 over the cover 18. The hub 24 is adapted to fit within the center opening of a disc 28 which rests in a horizontal position on the fingers 26 so as to be carried by the conveyor 16 along the horizontal path.

Figure 2:
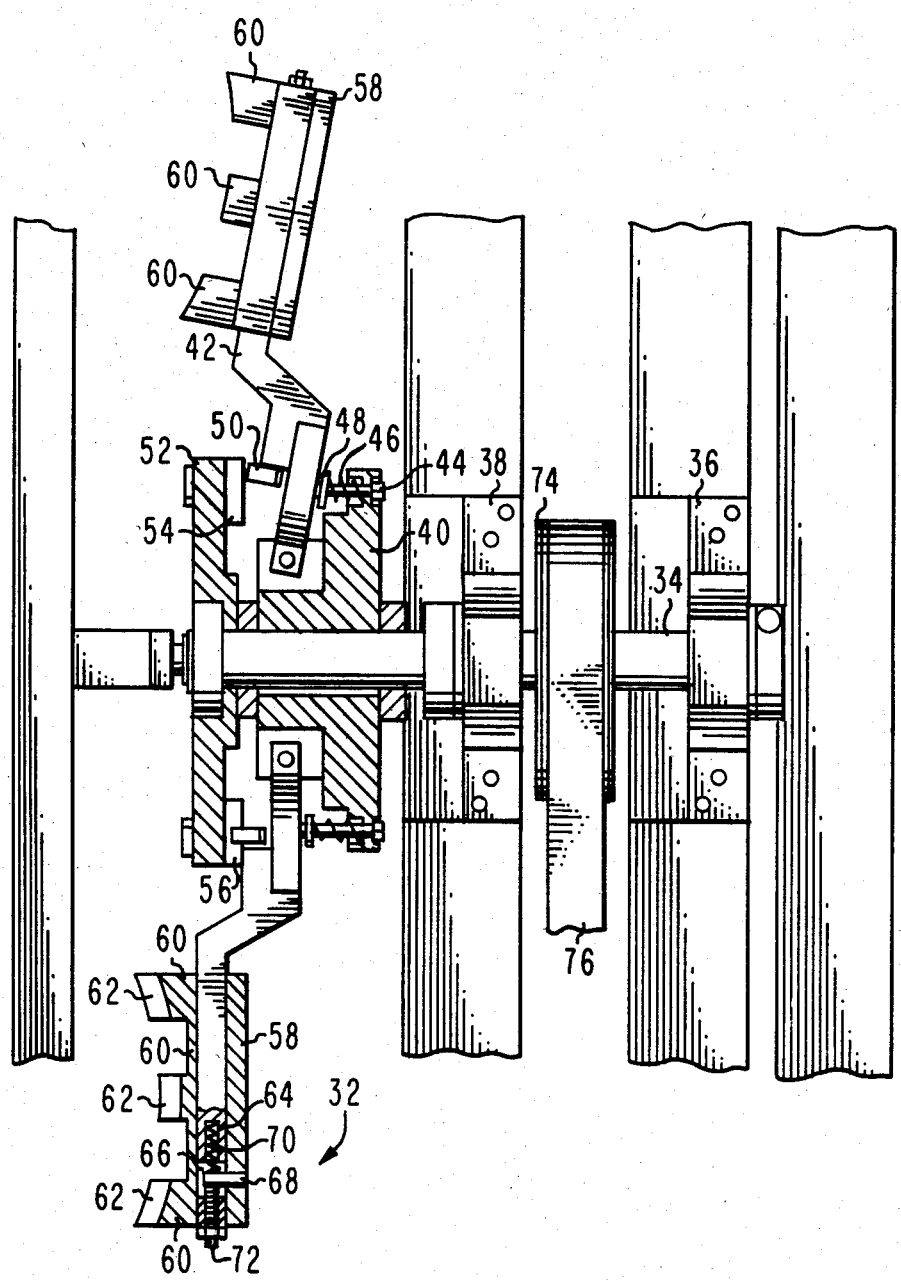
FIG. 2 is a top elevational view, partially sectioned, of one side of the turnover device.

The turnover device of the present invention, generally designated as 30, includes a pair of identical turnover arm supports 32 mounted on the top plate 12 at opposite sides of the conveyor 16. Referring to FIG. 2, each of the turnover arm supports 32 includes a shaft 34 rotatably supported in a pair of spaced bearings 36 and 38 which are mounted on the top plate 12. The shaft 34 is supported with its longitudinal axis being perpendicular to the path of the conveyor 16 and with the front end of the shaft 34 being adjacent the conveyor 16. An arm support wheel 40 is mounted on the shaft 34 adjacent the front end thereof. Four pickup arms 42 are mounted in circumferentially spaced relation on the support wheel 40. The arms 42 are uniformally spaced around the wheel 40 with the inner ends of the arms 42 being pivotly mounted on the wheel 40 and with the arms extending radially outwardly from the wheel 40. The arms 42 are mounted on the wheel 40 so that the outer ends of the arms 42 can swing toward and away from the conveyor 16. A separate headed pin 44 extends through the wheel 40 and engages the back of an arm 42. A helical spring 46 surrounds each pin 44 and is compressed between the wheel 40 and a flange 48 on the pin 44. The spring 46 urges the arm 42 forward toward the conveyor 16.

A cam follower wheel 50 is mounted on the front of each arm 42 and engages the surface of a cam plate 52 which surrounds the end of the shaft 34 but is fixedly mounted on the supporting base 10. A pair of camming projections 54 and 56 are on the surface of the cam plate 52 which faces the arms 42 and are positioned so that the cam follower wheels 50 will roll over the projections 54 and 56. The camming projections 54 and 56 are arranged substantially 180° apart and substantially along a horizontal diameter of the cam plate 52. The camming projection 54 extends from slightly above the horizontal diameter to slightly below the horizontal diameter and the camming projection 56 extends from slightly below the horizontal diameter to the horizontal diameter. When the cam follower wheel 50 engages a camming projection 54 or 56, the pickup arm 42 is pivoted backwardly away from the conveyor 16 and when the cam follower wheel 50 moves beyond the camming projection the spring 46 pushes the pickup arm 42 back toward the conveyor 16.

A separate pickup head 58 is slidingly mounted on the outer ends of the pickup arms 42 for movement longitudinally along the pickup arm. Each pickup head 58 has three fingers 60 projecting therefrom toward the conveyor 16. Each of the fingers 60 has a slot 62 in its outer edge with the bottoms of the slot 62 extending along a circular line, the diameter of which is equal to the diameter of the disc to be picked up. Each of the pickup arms 42 has a hole 64 extending longitudinally therethrough from its free end and a slot 66 extending transversely therethrough and crossing the hole 64. A pin 68 extends from the pickup head 48 into the slot 66. A helical spring 70 is within the hole 64 and compressed between the bottom of the hole 64 and the pin 68. A stop screw 72 is threaded into the end of the hole 64 and projects into the slot 66. The spring 70 normally pushes the pin 68 against the end of the stop screw 72.

A pulley 74 is mounted on the shaft 34 between the bearings 36 and 38. An endless drive belt 76 extends around the pulley 74 and around a pulley 78 mounted on a shaft 80 which is rotatably supported beneath the top plate 12. The shaft 80 is connected through a slip clutch 82 to the drive means for the conveyor 16. Thus, the shaft 34 is rotated in unison with the conveyor 16. The arm support wheels 40 of the two arm supports 32 are positioned so that each of the pickup arms 42 on one of the support wheels 40 is directly opposed and parallel to a pickup arm 42 on the other support wheel 40. Thus, the pickup arms 42 are arranged in opposed pairs which rotate and operate in unison. The arm support wheels 40 are spaced apart a distance such that when the pickup arms 42 of each pair are in their normal forward position the bottom of the slot 62 in the pickup heads 58 are spaced apart a distance equal to the diameter of a disc 28.

In the operation of the turnover device 30, a disc 28 is placed on the support member fingers 26 with the hub 24 extending through the hole in the center of the disc so that the disc is supported in a flat, horizontal position. The conveyor 16 carries the disc along a horizontal path which passes between the arm supports 32 of the turnover device. The turnover arms 42 are being rotated in the direction of arrow 84 in planes parallel to the line of movement of the disc 28 about points adjacent the inner ends of the arms 42. As a disc 28 comes to the turnover device 30, a pair of opposed arms 42 are moving from below the plane of the disc 28 to the horizontal plane of the disc. As the arms 42 are moving from below the plane of the disc 28, the camming follower wheel 50 is riding on the camming projections 56 so that the arms 42 are pivoted backwardly away from the disc 28 so that the disc 28 can pass between the opposed arms 42. As the arms 42 reach the plane of the disc 28, the camming follower wheels 50 leave the projections 56 so that the springs 46 push the arms 42 toward each other so that the pickup heads 58 engage the edge of the disc 28 with the disc fitting into the slot 62 in the fingers 60.

Figure 3:
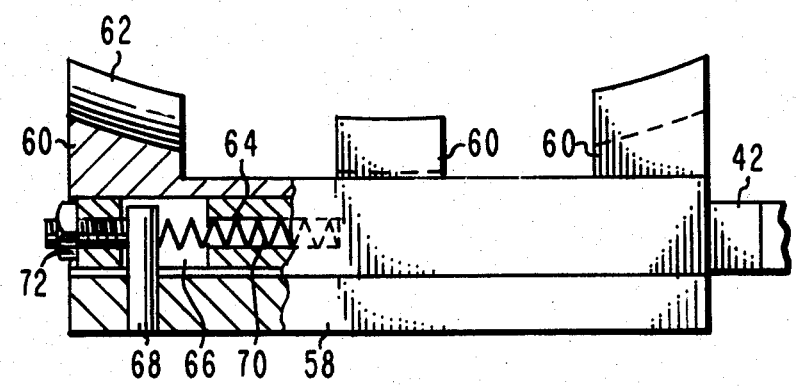
FIG. 3 is an elevational view, partially sectioned, of one of the pickup heads in its normal position with regard to the pickup arm.
Figure 4:
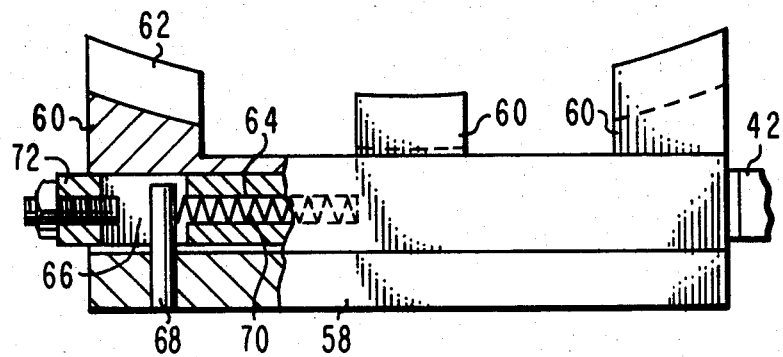
FIG. 4 is a view similar to FIG. 3 showing the pickup head in its position as it picks up a disc.

Just as the pickup heads 58 engage the edge of the disc 28 the pickup heads 58 are at their position at the very ends of the pickup arms 42 with the spring 70 holding the pins 68 against the stop screw 72 as shown in FIG. 3. However, when the pickup heads 58 engage the disc 28, since the disc 28 is moving forward in a horizontal direction, the disc 28 will cause the pickup heads 58 to move slightly horizontally on the pickup arms 42 as shown in FIG. 4. When the arms 42 have rotated sufficiently to lift the disc 28 from the horizontally moving hub 24, the spring 70 will move the pickup heads 58 back to their initial position shown in FIG. 3. Thus, the disc 28 is moved from its horizontally moving condition to a rotating condition without damaging the disc.

The disc 28 is then carried by the rotating arms 42 through 180°. When the pickup arms 42 reach the horizontal position 180° from the horizontal pickup position, the camming follower wheels 50 will engage the camming projection 54 to cause the pickup heads 58 to move apart and thus drop the disc 28 back onto the conveyor 16. The conveyor 16 is moving at a speed timed with the rotation of the arms 42 so that a support member will be directly under the disc 28 when it is released by the pickup heads 58. Thus, the disc 28 will drop onto the support member fingers 26 with the hub 24 fitting into the hole in the disc 28 and the disc will be carried horizontally away from the turnover device 30.

Thus, there is provided by the present invention a turnover device 30 which picks up discs from a continuously moving conveyor, turns the disc over through 180° and then releases the disc back onto the conveyor. The turnover device 30 achieves the turning over of the disc without damaging the disc even though the motion of the disc is changed from horizontal to rotational and then back to horizontal.

We claim:

1. An apparatus for turning a disc over comprising
a conveyor for supporting a disc in a flat horizontal position and carrying said disc along a horizontal path,
a pair of spaced parallel arms at opposite sides of said conveyor with each arm being rotatable about a point adjacent one end thereof in a plane parallel to the path of movement of said conveyor,
a pickup head on the other end of each arm and slidable along the arm, and
means for moving said other ends of the arms toward each other to pick up a disc and away from each other to release the disc.

2. Apparatus in accordance with claim 1 in which each of said arms is pivotally mounted at one end on a separate wheel which is rotatably mounted about an axis perpendicular to the path of movement of the conveyor.

3. Apparatus in accordance with claim 2 including a separate cam plate fixedly mounted between each of the wheels and the conveyor, each of said arms having a cam follower engaging the surface of the adjacent cam plate, means on said cam plate for pivoting the arm away from the conveyor and means between the wheel and the arm for pivoting the arm toward the conveyor.

4. Apparatus in accordance with claim 3 in which the means for pivoting the arms toward the conveyor includes a spring compressed between the arm and the wheel.

5. Apparatus in accordance with claim 4 in which the means for pivoting the arms away from a conveyor includes projections on the surface of the cam plate over which the cam follower moves.

6. Apparatus in accordance with claim 5 in which each cam plate includes two projections positioned substantially 180° apart and substantially along a horizontal diameter of the cam plate.

7. Apparatus in accordance with claim 6 in which one of the projections extends from slightly below the horizontal diameter to the horizontal diameter and the other projection extends from slightly above to slightly below the horizontal diameter.

8. Apparatus in accordance with claim 2 including a plurality of arms pivotally mounted in circumferentially spaced relation around each of said wheels and extending radially from the wheel, each of said arms on one of said wheels being in parallel opposed relation with an arm on the other wheel so as to provide a plurality of said opposed arms.

9. Apparatus in accordance with claim 1 including means between each arm and its pickup head for urging the head toward a position outwardly toward the end of the arm but allowing limited longitudinal movement of the head inwardly along the arm.

10. Apparatus in accordance with claim 9 in which each arm has a blind hole extending longitudinally therethrough from its outer end and a slot extending transversely therethrough across the hole, the head has a pin projecting into the slot and across the hole and a spring is compressed between the pin and the bottom of the hole.

11. Apparatus in accordance with claim 10 including a stop screw threaded into the end of the hole in the arm against which the pin is pressed by the spring.

12. Apparatus in accordance with claim 11 in which each head has a plurality of spaced fingers projecting therefrom toward the conveyor and each of said fingers has a slot in its end which is adapted to receive the edge of a disc.

* * * * *